US012470001B2

(12) United States Patent
Hegenauer et al.

(10) Patent No.: US 12,470,001 B2
(45) Date of Patent: Nov. 11, 2025

(54) PLUG CONNECTOR ASSEMBLY AND PLUG CONNECTION

(71) Applicant: Rosenberger Hochfrequenztechnik GmbH & Co. KG, Fridolfing (DE)

(72) Inventors: Johannes Hegenauer, Bergen (DE); Thomas Jaekel, Neuoetting (DE); Willem Blakborn, Inzell (DE); Johann Gottanka, Marktl (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 218 days.

(21) Appl. No.: 18/555,929

(22) PCT Filed: Apr. 20, 2022

(86) PCT No.: PCT/EP2022/060407
§ 371 (c)(1),
(2) Date: Oct. 18, 2023

(87) PCT Pub. No.: WO2022/223609
PCT Pub. Date: Oct. 27, 2022

(65) Prior Publication Data
US 2024/0222898 A1 Jul. 4, 2024

(30) Foreign Application Priority Data
Apr. 21, 2021 (EP) .................................... 21169675

(51) Int. Cl.
*H01R 13/187* (2006.01)
(52) U.S. Cl.
CPC ................................ *H01R 13/187* (2013.01)
(58) Field of Classification Search
CPC .... H01R 13/187; H01R 9/18; H01R 12/7047; H01R 4/489
See application file for complete search history.

(56) References Cited

U.S. PATENT DOCUMENTS

| 6,796,838 B2 * | 9/2004 | Yoshioka | H01R 13/748 439/607.41 |
| 7,252,559 B1 * | 8/2007 | Morello | H01R 13/113 439/852 |

(Continued)

FOREIGN PATENT DOCUMENTS

| FR | 2794293 A1 | 12/2000 |
| WO | 2011053276 A1 | 5/2011 |

OTHER PUBLICATIONS

European Search Report dated Oct. 14, 2021.
International Search Report dated Jul. 25. 2022.

*Primary Examiner* — Harshad C Patel
(74) *Attorney, Agent, or Firm* — Randall Danskin P.S.

(57) ABSTRACT

A plug connector assembly having a plug connector and a plug connector housing and multiple electric conductors, each electrical conductor having an axial end region inside the glug connector housing. A contact surface on each electric conductor electrically contacts a mating contact surface of a mating contact element of a mating plug connector. Each contact surface has a directional component orthogonal to a longitudinal axial direction of the electric conductor. At least one spring element for each electric conductor pushes the contact surface against the mating contact surface. The mating contact surface has a directional component orthogonal to the longitudinal axial direction of the mating contact element. Each contact surface additionally has a directional component in a second direction that is orthogonal to the first orthogonal direction. A securing element pushes the contact surface of each electric conductor against the mating contact surface in the second orthogonal direction.

19 Claims, 7 Drawing Sheets

(56) References Cited

U.S. PATENT DOCUMENTS

Figure 1A:
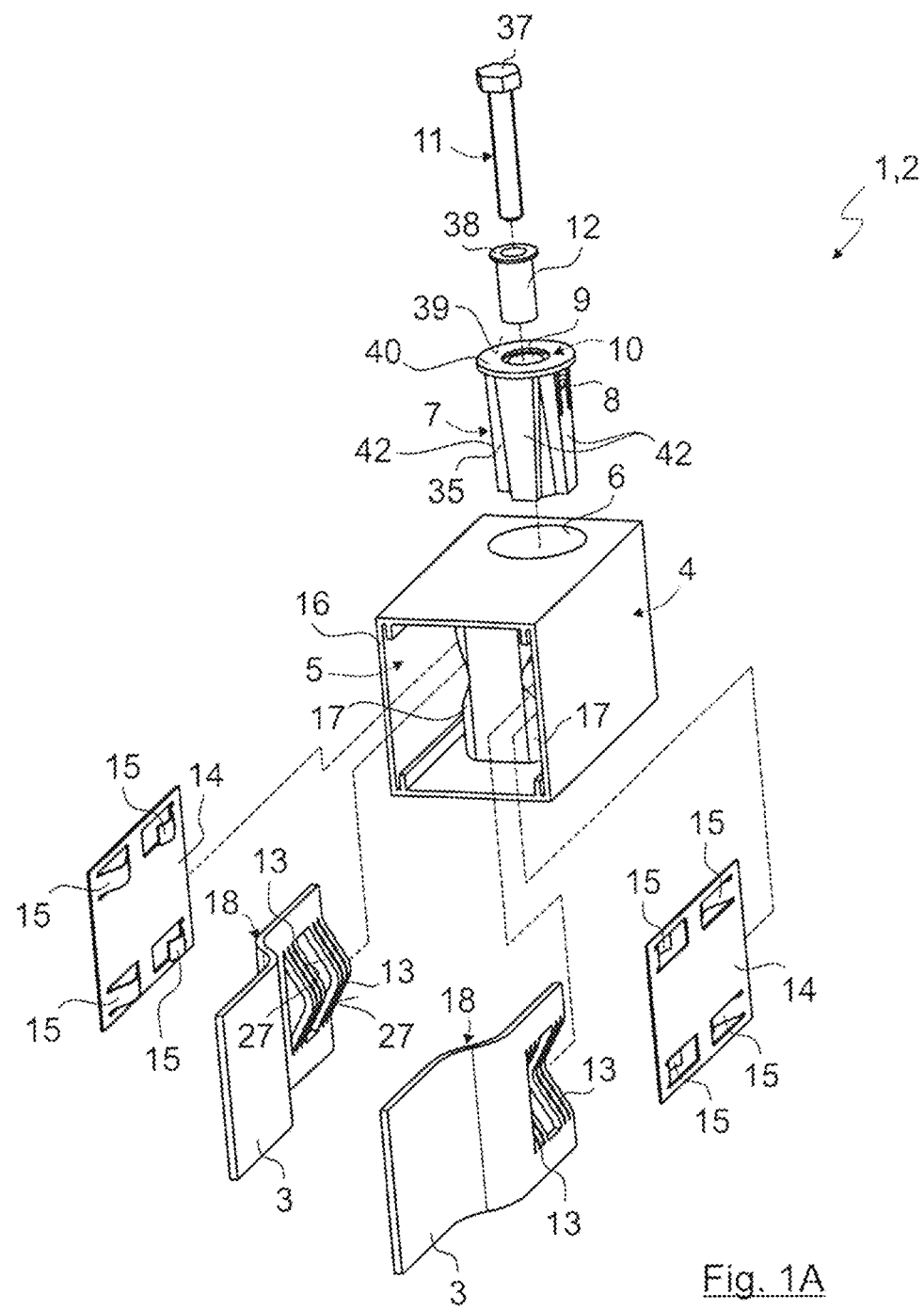

| | | | | |
|---|---|---|---|---|
| 7,632,148 | B1* | 12/2009 | Kawamura | H01R 24/22 |
| | | | | 439/607.41 |
| 8,298,022 | B2* | 10/2012 | Tsuruta | H01R 13/4365 |
| | | | | 439/948 |
| 9,011,186 | B2 | 4/2015 | Wirth | |
| 9,153,901 | B2* | 10/2015 | Yamashita | H01R 13/533 |
| 9,608,341 | B2 | 3/2017 | Saur | |
| 10,116,078 | B1* | 10/2018 | Durse | H01R 13/5208 |
| 10,193,247 | B1 | 1/2019 | Glick | |
| 10,490,931 | B2* | 11/2019 | Furuya | H01R 13/5208 |
| 10,873,147 | B2* | 12/2020 | Ueberschlag | H01R 13/44 |
| 11,258,198 | B1* | 2/2022 | Nedelea | H01R 13/502 |
| 11,476,615 | B2* | 10/2022 | Suzuki | H01R 13/5808 |
| 2002/0042228 | A1* | 4/2002 | Yoshioka | H01R 13/6592 |
| | | | | 439/98 |
| 2011/0076901 | A1* | 3/2011 | Glick | H01R 13/187 |
| | | | | 29/874 |
| 2012/0156947 | A1* | 6/2012 | Tyler | H01R 13/113 |
| | | | | 439/842 |

\* cited by examiner

PLUG CONNECTOR ASSEMBLY AND PLUG CONNECTION

CROSS-REFERENCE TO RELATED APPLICATIONS

This US National Stage Non-Provisional Patent Application claims priority to earlier filed PCT Patent Application No. PCT/EP2022/060407 which was filed on 20 Apr. 2022 and also claims priority to still earlier filed European Patent Application No. 21 169 675.2, which was filed on 21 Apr. 2021. The entire contents of the aforementioned earlier filed PCT Patent Application and the earlier filed European Patent Application are both expressly and fully incorporated herein by this reference.

Pursuant to USPTO rules, this priority claim to earlier filed PCT Patent Application No. PCT/EP2022/060407 which was filed on 20 Apr. 2022 and also to still earlier filed European Patent Application No. 21 169 675.2 which was filed on 21 Oct. 2021 Is also included in the Application Data Sheet (ADS) filed herewith.

FIELD OF INVENTION

The present invention relates to a plug connector assembly and to a plug connection.

BACKGROUND OF THE INVENTION

Plug connections are employed for the transmission of data signals and electrical supply currents. The electrical contacting between the contact element of the plug connector and the associated mating contact element of the mating plug connector is effected in particular in the case of electrical plug connections for high currents and high electrical voltages via contact strips arranged between them which produce a sufficient contact pressure between the contact element and the mating contact element.

DE 10 2013 217 256 B3 discloses, by way of example, a plug connection with a pin-shaped mating contact element and a contact sleeve, arranged between them, with individual contact strips. Such a plug connection is employed, for example, in electric or hybrid vehicles in the charging path between the charging interface and the battery, in the traction path between the battery and the electric drive or in further high-voltage paths between the battery and further electrical units.

Two contact transitions which increase the transfer impedance in the transmission path between the plug connector and the mating plug connector are produced between the contact element and the mating contact element by the interposed contact sleeve. Oxidation at the contact surfaces of the individual contact components which occurs over time in particular when aluminium is used as the contact material additionally impairs the transfer impedance in the transmission path. The growing trend of transmitting higher and higher currents or higher and higher electrical voltages in electric or hybrid vehicles in particular in the charging path is significantly restricted by an increased transfer impedance in the transmission path.

This is a situation which should be improved.

Reference should also be made to the following documents with respect to the technical background. EP 2 690 716 A1 relates to an electrical connecting element, comprising a basic body with at least one connecting section and at least one socket section, which has at least one contact arm for contacting a plug contact which can be introduced into the socket section, wherein the contact arm is divided into at least two partial contacts in a contact region in which the contacting of the introduced plug contact takes place. In addition, the electrical connecting element comprises an overspring which surrounds the basic body in the region of the socket section and has at least one overspring arm which interacts with the contact arm at least in the contact region such that said contact arm can be deflected counter to a restoring force of the overspring arm. WO 2011/053276 A1 relates to socket connectors which are designed such that they improve the pin contact engagement or the retaining force. FR 2 794 293 A1 relates to a contact element with an element which can be inserted into a cylindrical conductor body. Lastly, DE 20 2018 104 493 U1 relates to a spring with a stabilization feature for use with an electrical connecting socket.

Against this background, an object of the present invention is to provide a plug connection in particular for the transmission of higher currents or higher electrical voltages which has a minimized transfer impedance between the contact elements and the associated mating contact elements.

According to the invention, this object is achieved by a plug connector assembly having the features disclosed herein, including the features disclosed in the claims.

Accordingly, there is provided:

A plug connector assembly having a plug connector and a plurality of electrical conductors, and wherein the plug connector has a plug connector housing, in which an axial end region of each electrical conductor is inserted and fastened, and wherein, at each electrical conductor or, at each contact element which is in each case connected as a single piece to the respective electrical conductor, in each case, a contact surface is formed which is configured to electrically contact a mating contact surface of an associated mating contact element of a mating plug connector, and wherein the respective contact surface has, in each case, a directional component in a first direction orthogonal to a longitudinal axial direction of the respective electrical conductor, and wherein in each case at least one spring element is arranged in the plug connector housing for each electrical conductor, which is connected, in each case, to the respective electrical conductor, and is configured to press the contact surface against the mating contact surface, which has a directional component in a direction orthogonal to a longitudinal axial direction of the respective mating contact element, in the first direction orthogonal to the longitudinal axial direction of the respective electrical conductor.

The insight/idea on which the present invention is based consists in minimizing the number of contact transitions in the plug connection.

For this purpose, on the one hand, a direct contact between the contact partners of the plug connector and the mating plug connector is implemented with no interposition of a contact sleeve having contact strips. On the other hand, the contact surface of the contact partner belonging to the plug connector is formed either directly in the individual electrical conductor or in a contact element formed as a single piece with the individual electrical conductor.

In order to implement a sufficient contact pressure between the two contact partners, i.e. between the individual contact surface in the plug connector and the associated mating contact surface in the mating plug connector, provided for each electrical conductor inserted into the plug connector is in each case at least one spring element which presses in-each ease the electrical conductor and hence the contact surface belonging to the electrical conductor against the associated mating contact surface in the mating plug connector. The electrical conductor is thus arranged between the spring element and the associated mating contact element.

In order to minimize the structural space for the plug connection, in the plugged state of the electrical plug connection the electrical conductors and the associated mating contact elements each need to be arranged relative to one another in a direction which is in each case orthogonal to the longitudinal axis of the electrical conductors and simultaneously to the longitudinal axis of the mating contact elements. The longitudinal axis of the electrical conductor and the associated mating contact element are thus laterally spaced apart from each other, i.e. arranged relative to each other in the direction of the transverse extent of the electrical conductor and the associated mating contact element. It should be mentioned in this context that a longitudinal extent or a longitudinal axis of a body is understood to mean the largest extent or the direction with the largest extent of a body, and the transverse extent is understood to mean the smaller extent of a body.

The contact surface of each electrical conductor, or of each contact element, which is connected as a single piece to the respective electrical conductor thus has a directional component which is orthogonal to the longitudinal axis of the electrical conductor or of the mating contact element. As a consequence, each spring element, which is connected to an electrical conductor, presses the contact surface of the electrical conductor or the contact surface of the contact element connected as a single piece to the electrical conductor in a first direction orthogonal to the longitudinal axis of the electrical conductor and against the mating contact surface on the associated mating contact element.

During operation, a constant and sufficient force in a first direction orthogonal to the longitudinal axis of the electrical conductor is in each case exerted via the individual spring elements from the contact surface to the associated mating contact surface. The contact surface which is designed so that it complements the mating contact surface consequently contacts the associated mating contact surface over the whole surface with no air included. Oxidation or corrosion of the contact surface and the mating contact surface is thus advantageously excluded. It is thus also possible to avoid impairment of the transfer impedance because of surface oxidation at the contact or mating contact surfaces over the operating time.

In addition, age-related contact fatigue, so-called contact relaxation, in the contact region of the electrical conductor or in the contact region of the contact element connected as a single piece to the electrical conductor because of the permanent application of force by the at least one spring element can be prevented.

The plug connector assembly is preferably a plug connector assembly for the transmission of a high current or a high electrical voltage. A high current is understood to mean a current to be transmitted of between typically 300 A and 600 A in an electric or hybrid vehicle. The range of the high electrical voltage to be transmitted in an electric or hybrid vehicle is preferably between 450 V and 1500 V and particularly preferably between 750 V and 1000 V.

The electrical conductor is preferably designed as a flat electrical conductor. A flat electrical conductor is herein understood to mean an electrical conductor with a first transverse extent and a second transverse extent in which the first transverse extent is larger, preferably many times larger, than the second transverse extent. The surface, formed by the first transverse extent and the longitudinal extent, of the flat electrical conductor preferably has a plane design. The first transverse extent of the flat electrical conductor is preferably oriented orthogonally to the second transverse extent and a rectangular cross-sectional profile is thus achieved.

Depending on the application, the flat electrical conductor can be configured as a busbar, i.e. as a rigid flat electrical conductor or as a cable, the strands of which are each compacted relative to one another at the axial end. In the latter case, the flat electrical conductor has a rigid design at least in one axial end region. Lastly, the flat electrical conductor can also, because of its dimensioning and the material used for it, have a certain bending elasticity for flexible installation in the body of the electric or hybrid vehicle.

Preferably two electrical conductors for the transmission of a direct current or alternating current are inserted in the plug connector assembly. However, three electrical conductors for the transmission of a three-phase current, or a multiple (which is a whole number) of pairs of electrical conductors for the transmission of multiple direct and/or alternating currents are also conceivable.

The individual electrical conductors are fastened in the plug connector housing of the plug connector assembly preferably in form-fitting fashion by means of a suitable shape of a certain longitudinal section of the individual electrical conductors and a matching shape of an associated channel for the electrical conductor in the plug connector housing. However, force-fitting and possibly also materially bonded fixing of the individual electrical conductors in the plug connector housing is also conceivable.

The plug connector housing, which is configured as a single part or multiple parts and preferably as two parts, has an opening through which the electrical conductors are inserted. In order to contact the electrical conductors with associated mating contact elements, the plug connector housing has a further opening through which the mating contact elements of the mating plug connector can be inserted into a common receiving chamber or in each case into individual receiving chambers inside the plug connector housing.

Suitable forms for the technical functions of fastening, securing, sealing, etc are implemented in the plug connector housing in accordance with current knowledge. Lastly, the plug connector housing needs to be produced from a suitable dielectric material and be dimensioned appropriately in order to satisfy the requirements, needed for the transmission of high currents and high voltages, for dielectric strength in the air gaps and creepage paths.

The electrical conductor and the contact element connected as a single piece to the electrical conductor are preferably to be produced in each case from a metal material with good electrical conductivity, high abrasion resistance and at the same time a low specific density. Aluminium or alternatively copper is preferably used. Silver is preferably used as a coating material in order to improve the contact resistance.

The electrical conductor and the associated contact element are connected as a single piece preferably in a materially bonded fashion, for example by means of soldering or welding.

Advantageous embodiments and developments can be found in the description and claims herein including with reference to the Figures.

It should be understood that the abovementioned features and those which will be explained herein can be used not only in the respective stated combinations but also in other combinations or in isolation without going beyond the scope of the present invention.

According to the invention, the contact surface has, in addition to a directional component which is directed in a first direction orthogonal to the longitudinal axial direction of the electrical conductor, a directional component in a second direction orthogonal to the longitudinal axial direction of the electrical conductor and to the first orthogonal direction. As a consequence, the mating contact surface of the associated mating contact element has not only a directional component which is directed in a direction orthogonal to the longitudinal axial direction of the mating contact element, but additionally a directional component in the longitudinal axial direction of the mating contact element.

Additionally arranged in the plug connector housing is a fastening element which is configured to effect fastening of the plug connector to the mating plug connector with a corresponding fastening element in the mating plug connector. The fastening element of the plug connector and the complementary fastening element of the mating plug connector cause a sufficient contact pressure between the contact surfaces and the associated mating contact surfaces in the longitudinal axial direction of the mating contact element.

In this case, a normal force acts in each case from the individual contact surfaces of the plug connector to the associated mating contact surfaces of the mating plug connector which has in each case a directional component in the longitudinal axial direction of the mating plug connector and at the same time a directional component orthogonal to the longitudinal axial direction of the mating contact element.

Because the individual contact surfaces and the associated mating contact surfaces each have a directional component in the longitudinal axial direction of the mating contact element and a directional component orthogonal to the longitudinal axial direction of the mating contact element, in the plugging process a relative movement occurs between the individual contact surfaces and the associated mating contact surfaces along the contact surface and the mating contact surface. This represents a frictional movement of the contact surface at the associated mating contact surface (sliding friction) which is advantageously associated with abrasion of an oxide layer at the contact surface and at the mating contact surface. In the plugged state of the plug connector and the mating plug connector, the contact force which needs to be applied by the fastening element and acts in the plugging direction is advantageously reduced because of the static friction.

The contact surface and the associated mating contact surface, which each have a directional component in the longitudinal axial direction of the mating contact element and a directional component transverse to the longitudinal axial direction of the mating contact element, can each have either a plane or bulged shape. In the case of a bulged or curved shape, both a convex or a concave bulge in one direction or in two directions is possible. A plane contact surface and a plane mating contact surface each have the same orientation. A bulged contact surface and a bulged mating contact surface each have the same curvature.

The fastening element is a fastening screw in a preferred manifestation. In its longitudinal extent, i.e. with the screw shaft, the fastening screw is directed in the longitudinal axial direction of the mating contact elements and can be screwed into a screw sleeve in the mating plug connector. The screw sleeve has an internal thread corresponding to the external thread of the fastening screw. The screw sleeve thus represents the fastening means of the mating plug connector and the mating fastening means of the fastening.

The fastening screw can be inserted into the plug connector housing via a passage formed in the plug connector housing in the longitudinal axial direction of the mating contact elements. The fastening via a screw connection offers the advantage of implementing a sufficiently high fastening and contact force and thus a secure fastening and contacting.

A latching connection is also conceivable as a fastening between the plug connector and the mating plug connector as an alternative to a screw connection. For this purpose, latching means such as, but not limited to, latching hooks, latching tabs, latching lugs, spring arms, snap-fit hooks, etc can be formed on the plug connector housing, and associated mating latching means such as, but not limited to, latching recesses, snap-fit recesses, etc can be formed on the mating plug connector housing. In order to implement a sufficient contact pressure in the longitudinal axial direction of the mating contact elements between the individual contact surfaces and the associated mating contact surfaces, in the case of a latching connection an additional spring element for each electrical conductor needs to be provided in each case which is connected to the respective electrical conductor and presses the respective contact surface against the associated mating contact surface in the longitudinal axial direction of the mating contact elements. The additional spring element which exerts a spring force on an electrical conductor in the longitudinal axial direction of the mating contact elements thus needs to be arranged in the longitudinal axial direction of the mating contact elements on a side of the electrical conductor inside the plug connector housing which is situated opposite a side of the electrical conductor with the contact surface.

Similarly, the spring element, which exerts a spring force on an electrical conductor transversely to the longitudinal axial direction of the mating contact elements, needs to be arranged in a direction transverse to the longitudinal axial direction of the mating contact elements on a side of the electrical conductor inside the plug connector housing which is situated opposite a side of the electrical conductor with the contact surface.

By virtue of the arrangement of the spring elements outside the contacting region, the number of contact transitions and thus the transfer impedance in the contacting region can be minimized with the simultaneous formation of contact pressure between the two contact partners. In order to implement the contact pressure between the two contact partners and thus to transmit the spring tension from the spring element to the electrical conductor, the spring element needs to be positioned between the plug connector housing and the electrical conductor in a pretensioned state.

The spring element is shaped in a preferred manifestation as a spring tab in a metal plate, preferably in a piece of sheet metal. Such an implementation favours the formation of multiple spring tabs in the metal plate. The application of multiple spring tabs of a metal plate to an electrical conductor is advantageous in particular in the case of electrical conductors with multiple parallel contact surfaces and/or in the case of a flat cross-sectional geometry of the electrical conductor, for example in the case of a flat electrical conductor. The metal plate with the individual spring tabs can thus be arranged between the plug connector housing and the flat electrical conductor parallel to the flat electrical conductor and thus parallel to the individual parallel contact surfaces. In this way, the parallel and equal transmission of force from the individual spring tabs to the individual contact surfaces of the electrical conductor is in each case ensured in a direction transverse to the longitudinal axis of the mating contact elements.

Instead of a spring tab which is punched and/or bent from a metal plate, any other spring variant can be applied for the spring element, for example a helical spring or an elastomeric element.

Because the contact surface and the mating contact surface have, in a preferred manifestation in each case, one directional component in a longitudinal axial direction of the mating contact elements and one directional component transverse to the longitudinal axial direction of the mating contact elements, multiple alternative embodiments are, as shown herein, conceivable for the contacting in the case of a laterally spaced apart arrangement of the longitudinal axes of the electrical conductor and the associated mating contact element in the plugged state of the plug connector and the mating plug connector. The longitudinal axes of the electrical conductor and the mating contact element are not only spaced apart from one another laterally but preferably also oriented orthogonally with respect to one another.

In a first variant of such contacting, the electrical conductor needs to be deformed in the axial end region transversely to the longitudinal axis in such a way that a contact surface, which not only has a directional component in the longitudinal axial direction of the mating contact element but also has a directional component transverse to the longitudinal axial direction of the mating contact element, is formed in the deformed region.

In the case of a flat electrical conductor with a larger first transverse extent which runs parallel to the longitudinal axis of the mating contact element, deformation, preferably punching and/or bending, of the electrical conductor in a first direction orthogonal to the longitudinal axis of the electrical conductor, i.e. In the direction of the smaller second transverse extent, is necessary in order to form such a contact surface in the axial end region of the electrical conductor.

Such deformation in the case of a flat electrical conductor which is positioned and oriented in this way with respect to the mating contact element can be, for example, a region which is deformed as a strip or tab which protrudes from the flat electrical conductor by means of punching and bending. Whilst the strip-shaped region is attached to both ends of the flat conductor, the tab-shaped region is connected to the flat conductor at just one end.

In a second variant of the contacting, the electrical conductor is connected as a single piece in the axial end region to a contact element at which a contact surface is formed with a directional component in a longitudinal axial direction of the mating contact element and a directional component transverse to the longitudinal axial direction of the mating contact element. The contact element can be connected to the electrical conductor transversely to the longitudinal axis of the electrical conductor or at the front end of the electrical conductor. In both cases, it is essential that the contact element extends from the electrical conductor in the direction of the longitudinal axis of the mating contact element to be contacted and hence contacting with the mating contact element can be effected.

Such a formation at the contact element can be in the shape of, for example, a strip, tab, rib or lug.

In a third contacting variant, a margin, to the side with respect to the longitudinal axis of the electrical conductor, of the electrical conductor is shaped in such a way that the shaped lateral margin of the electrical conductor forms the contact surface. The lateral surface of the electrical conductor is here shaped so that it is complementary with the mating contact surface of the associated mating contact element. The shaping of the lateral surface as a contact surface relates to all aspects of the surface profile such as, for example, its orientation, curvature, etc.

In the case of a flat electrical conductor, the lateral surface shaped as a contact surface according to the third variant is preferably the smaller lateral surface. The smaller second transverse extent of the flat electrical conductor here runs parallel to the longitudinal axis of the mating contact element.

In the case of such an orientation of the flat electrical conductor with respect to the longitudinal axis of the mating contact element, the formation of a contact surface on a region of the electrical conductor which is deformed as a tab is alternatively also conceivable. Lastly, attachment of a contact element with a tab-shaped, rib-shaped or lug-shaped form at the smaller lateral surface in the axial end region of the flat electrical conductor is also possible.

In order to transmit a direct or alternating current, two electrical conductors, which contact two mating contact elements arranged in parallel in the mating plug connector in the plugged state, are inserted in parallel in a plug connector. Because the longitudinal axes of the two electrical conductors are arranged in the plugged state in each case laterally with respect to the longitudinal axes of the associated mating contact elements, the two parallel electrical conductors in each case can enclose the two mating contact elements so that they are more closely spaced apart from one another in the intermediate region between the two mating contact elements or are spaced further apart from one another. For the transmission of multiple direct or alternating currents, the individual pairs of electrical conductors and the associated pairs of mating contact elements each need to be arranged in parallel to one another.

In order to increase the current carrying capacity between the electrical conductor and the associated mating contact element, a plurality of parallel contact surfaces are formed at the electrical conductor in such a way that they can each be contacted with an associated mating contact surface at the mating contact element. The parallel contact surfaces can, for example, each be formed at one of a plurality of regions deformed in parallel on the electrical conductor.

Alternatively, the parallel contact surfaces can each be formed on a common contact element connected to the electrical conductor as a single piece. Lastly, each of the parallel contact surfaces can in each case also be formed on a separate contact element which is connected in each case to the electrical conductor as a single piece.

Because a contact surface and an associated mating contact surface necessarily cannot have exact planarity and exact planarity relative to each other, which impairs the transfer impedance, in a preferred expansion of the contacting system the individual contact surface is broken up into a plurality of partial contact surfaces. Such a technical measure increases the number of contact points between the contact surface and the mating contact surface and thus improves the transfer impedance. In the case of a region, deformed as a strip or tab, of the contact surface of the electrical conductor, the number of contact points can be obtained by slotting the regions which are deformed as strips or tabs. The number of contact points can also be increased by slotting of the rib-shaped, lug-shaped or tab-shaped contact regions in the case of a rib-shaped, lug-shaped or tab-shaped contact region of a contact element connected to an electrical conductor as a single piece.

In a further preferred manifestation of the invention, each contact surface in each case has a structured surface, preferably a grooved surface. The structured surface of the contact surface can also have a microstructure consisting of pointed projections, sharp-edged teeth or sharp-edged ridges. The structured surface of the contact surfaces impairs the transfer impedance only to a negligible degree but does make it possible to break up an oxide layer on the mating contact surface during the plugging procedure. In addition, the mating contact surfaces can each also have a structured surface for breaking up an oxide layer on the associated contact surface.

Because of the latent application of the spring force of the assigned spring elements to the electrical conductor, undesired displacement or undesired tilting of the associated mating contact elements can occur over time, combined with material fatigue of the dielectric material of the mating plug connector housing. For the purpose of mechanical stabilization of the contacting system, a clamping element is inserted into a passage which is formed in the plug connector housing in the longitudinal axial direction of the mating contact elements, and into a recess which is formed in the mating plug connector housing, flush with the passage of the plug connector housing. The clamping element is inserted into the recess of the mating plug connector housing in such a way that the clamping element is connected to the regions, adjacent to the recess, of the mating plug connector housing in a force-fitting fashion, preferably via a press fit.

By virtue of the press fit between the clamping element and the mating plug connector housing, material compaction and hence increased material strength advantageously occur in a region of the mating plug connector housing in which material fatigue would occur if there were no clamping with a clamping element. Displacement or tilting of the mating contact element and hence increased transfer impedance and, in an extreme scenario, a loss of contact between the electrical conductors and the associated mating contact elements can thus advantageously be avoided.

The clamping element is preferably manufactured from a dielectric material. In a preferred arrangement of the contact partners in which the two mating contact elements are arranged between the two electrical conductors, the clamping element is arranged in a recess between the two mating contact elements inside the mating plug connector. The clamping element in which, in the plugged state of the plug connection, the fastening screw and the associated screw sleeve are arranged has a sleeve-shaped region.

In order to obtain a clamping effect, the clamping element has at least two clamping jaws which are formed radially outwards in two opposite directions from the sleeve-shaped region of the clamping element. These two clamping jaws are each arranged in a recess formed between the two mating contact elements and prevent displacement or tilting of the mating contact elements. For the purpose of better mechanical stabilization of the clamping element inside the mating plug connector, four clamping jaws are formed on the clamping element which are each shaped radially outwards from the sleeve-shaped region in the four directions orthogonally to one another. The two further clamping jaws are here anchored in a slot between two contacting regions of the two mating contact elements.

In a further arrangement of the contact partners in which the two electrical conductors are arranged between the two mating contact elements, two clamping elements are preferably provided which each are pressed in force-fitting fashion into a recess between the respective mating contact element and the outer wall of the mating plug connector housing. The two clamping elements are suitable for connection to the fastening element, in particular to the fastening screw.

Each clamping element can be connected in each case to the plug connector housing preferably in a form-fitting fashion, for example via a latching connection. Each dielectrically formed clamping element is moreover to be connected to the fastening element, in particular to a metal fastening screw. A metal sleeve, which is to be connected via a screw connection to the metal fastening screw and via a press fit to the dielectric clamping element, is preferably to be provided for this purpose.

Also covered by the invention is a plug connection. The plug connection has the plug connector assembly with the plug connector and a mating plug connector corresponding to the plug connector. The contact surface formed in each case on each electrical conductor of the plug connector assembly, or the contact surface formed in each case on each contact element of the plug connector assembly, here contacts the corresponding mating contact surface which is formed in each case on an associated mating contact element.

The features already explained with respect to the plug connector assembly can be applied analogously for the plug connection.

A method for providing an electrical connection via a plug connection comprising a plug connector and a mating plug connector is also disclosed herein. An electrical high-voltage transmission between the plug connector and the mating plug connector is configured which comprises at least the following method steps: (a) connecting a plurality of electrical conductors, opening into the plug connector, to associated mating contact elements of the mating plug connector; and (b) locking the electrical plug connection between a plug connector housing of the plug connector and a mating plug connector housing of the mating plug connector.

The above embodiments and developments can, where meaningful, be combined with one another in any desired fashion. Further possible embodiments, developments and implementations of the invention also comprise combinations, not explicitly mentioned, of features of the invention which are described above or below with regard to the exemplary embodiments. In particular, a person skilled in the art will thus also add individual aspects as improvements or supplements to the respective basic shape of the present invention.

SUMMARY

Our invention generally provides a plug connector assembly (1) having a plug connector (2) and a plurality of electrical conductors (3).

A principal aspect of the present invention is a plug connector assembly (1) having a plug connector (2) and a plurality of electrical conductors (3), wherein the plug connector (2) has a plug connector housing (4), in which an axial end region (32) of each electrical conductor (3) is inserted and fastened, wherein, at each electrical conductor (3) or at each contact element (31) which is in each case connected as a single niece to the respective electrical conductor (3), in each case a contact surface (27) is formed which is configured to electrically contact a mating contact surface (26) of an associated mating contact element (22) of a mating plug connector (19), wherein the respective contact surface (27) has in each case a directional component in a first direction orthogonal to a longitudinal axial direction of the respective electrical conductor, wherein in each case at least one spring element (15) is arranged in the plug connector housing (4) for each electrical conductor (3), which is connected in each case to the respective electrical conductor (3), and is configured to press the contact surface (27) against the mating contact surface (26), which has a directional component in a direction orthogonal to a longitudinal axial direction of the respective mating contact element (22), in the first direction orthogonal to the longitudinal axial direction of the respective electrical conductor (3), characterized in that the respective contact surface (27) additionally has a directional component in a second direction orthogonal to the longitudinal axial direction of the electrical conductor (3) and to the first orthogonal direction, and arranged in the plug connector housing (4) is a fastening element (11) which is configured, when connected to a fastening element (28) of the mating plug connector (19), to press in the second orthogonal direction the contact surface (27) of each electrical conductor (3) or each contact element (31) against the mating contact surface (26) of the associated mating contact element (22), said mating contact surface (26) additionally having a directional component in the longitudinal axial direction of the respective mating contact element (22).

A further aspect of the present invention is a plug connecter assembly (1), characterized in that the fastening element (11) arranged in the plug connector housing (4) is designed as a fastening screw (11), and the fastening element (11) of the mating plug connector (19) is designed as a screw sleeve (28).

A further aspect of the present invention is a plug connector assembly (1), characterized in that the spring elements (15) are arranged in each case on that side of the electrical conductor (3) in the plug connector housing (4) which is situated opposite that side of the electrical conductor (3) on which the contact surface (27) is formed.

A further aspect of the present invention is a plug connector assembly (1), characterized in that the spring elements (15) which are connected to the electrical conductor (3) are in each case shaped as a spring tab (15) in a metal plate (14).

A further aspect of the present invention is a plug connector assembly (1), characterized in that each electrical conductor (3) is in each case configured in such a way that its longitudinal axis is arranged, in a plugged state of the plug connector (2) and the mating plug connector (19), laterally spaced apart from a longitudinal axis of the associated mating contact element (22).

A further aspect of the present invention is a plug connector assembly (1), characterized in that each electrical conductor (3) is deformed in each case laterally with respect to the longitudinal axis of the respective electrical conductor (3) in such a way that the respective contact surface (27) is formed in a deformed region (13) of the respective electrical conductor (3), or each contact element (31) is shaped in each case laterally with respect to the longitudinal axis of the respective electrical conductor (3) in such a way that the respective contact surface (27) is formed in the respective contact element (31).

A further aspect of the present invention is a plug connector assembly (1), characterized in that the deformed region (13) of the electrical conductor (3) is deformed in each case preferably as a strip or tab and the contact elements (31) are shaped in each case preferably as a strip, tab, rib or A further aspect of the present invention is a plug connector assembly (1), characterized in that a lateral surface (44) is shaped in each case on each electrical conductor (3) in such a way that the respective contact surface (27) is formed on the lateral surface (44), wherein the lateral surface (44) is arranged transversely to the longitudinal axis of the respective electrical conductor (3).

A further aspect of the present invention is a plug connector assembly (1), characterized in that a plurality of contact surfaces (27) are formed in each case on each electrical conductor (3) or in each case on the contact element (31) connected in each case to each electrical conductor (3), or a contact surface (27) is formed in each case on a plurality of contact elements (31) connected in each case to each electrical conductor (3), wherein each contact surface (27) is in each case configured to electrically contact an associated mating contact surface (26) of the associated mating contact element (22).

A further aspect of the present invention is a plug connector assembly (1), characterized in that each contact surface (27) has in each case a structured surface, preferably a grooved surface.

A further aspect of the present invention is a plug connector assembly (1), characterized in that in each case a clamping element (7) is inserted into at least one passage (6), which is formed in each case in the plug connector housing (4) in the direction of the mating plug connector (19), and is configured so that it can be inserted into an associated recess (34) which is formed in a mating plug connector housing (20), flush with the respective passage (6) and so that it can be connected to the mating plug connector housing (20) in a force-fitting fashion.

A further aspect of the present invention is a plug connector assembly (1), characterized in that the respective clamping element (7) Is connected to the fastening element (11), wherein the fastening element (11) is configured, when connected to the fastening element of the mating plug connector (19), to press the respective clamping element (7) Into the associated recess (34) of the mating plug connector housing (20).

A further aspect of the present invention is a plug connector assembly (1), characterized in that the electrical conductor (3) is a flat electrical conductor.

A still further aspect of the present invention is a plug connector assembly (1), characterized in that the electrical conductor (3) is designed to transmit a current in the range between 300 A and 600 A.

An even still further aspect of the present invention is a plug connection (30) with a plug connector assembly (1) and a mating plug connector (19) corresponding to the plug connector (2), wherein a contact surface (27) formed on each electrical conductor (3) and the contact surface (27) formed on each contact element (31) electrically contact the mating contact surface (26) formed on the associated mating contact element (22) of the mating plug connector (19).

These and other aspects of the present invention are more fully set forth and disclosed herein.

BRIEF DESCRIPTIONS OF THE FIGURES

The present invention is explained in detail below on the basis of the exemplary embodiments given in the schematic Figures of the drawings.

Figure 1B:
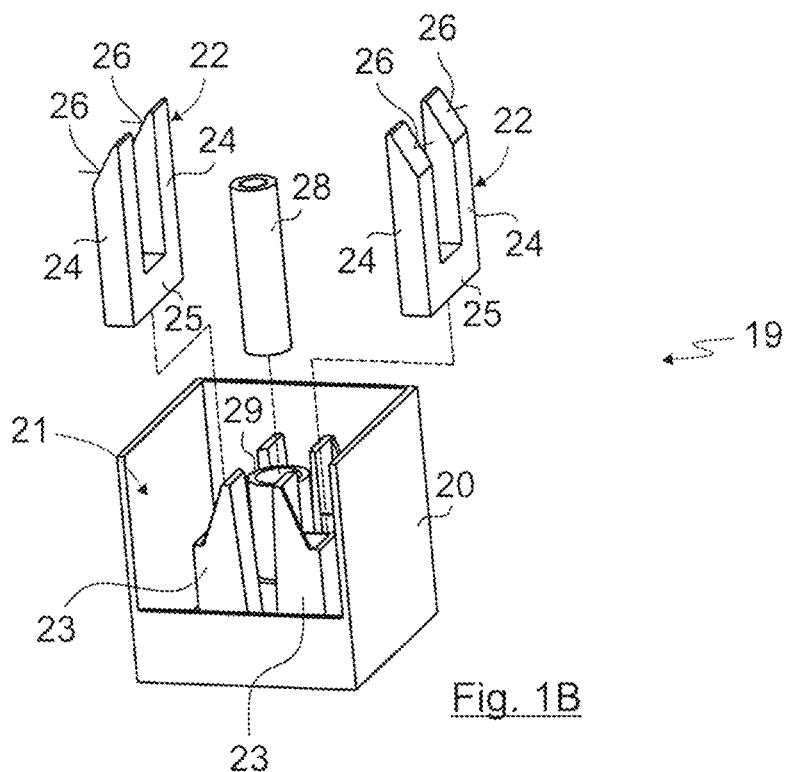

FIGS. 1A, and 1B show an exploded illustration of the plug connector assembly according to the invention and the mating plug connector.

Figure 2A:
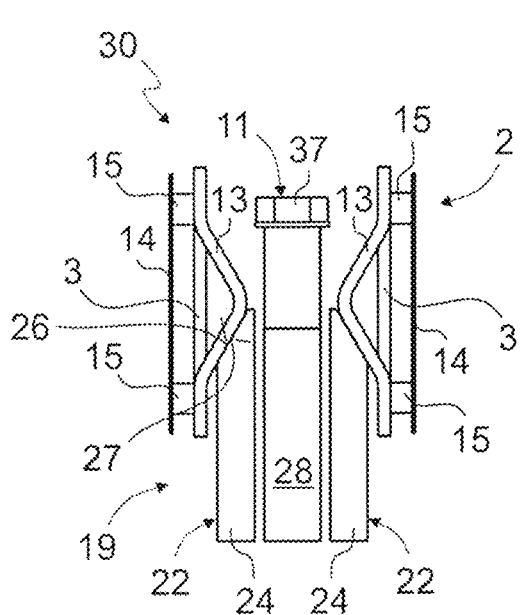
Figure 2B:
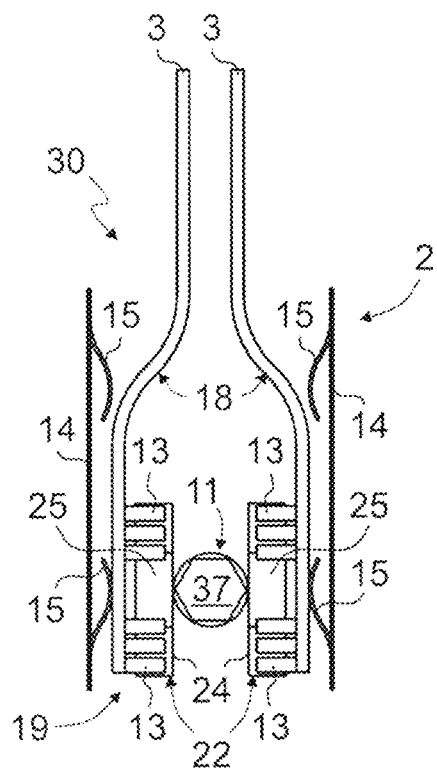
Figure 3A:
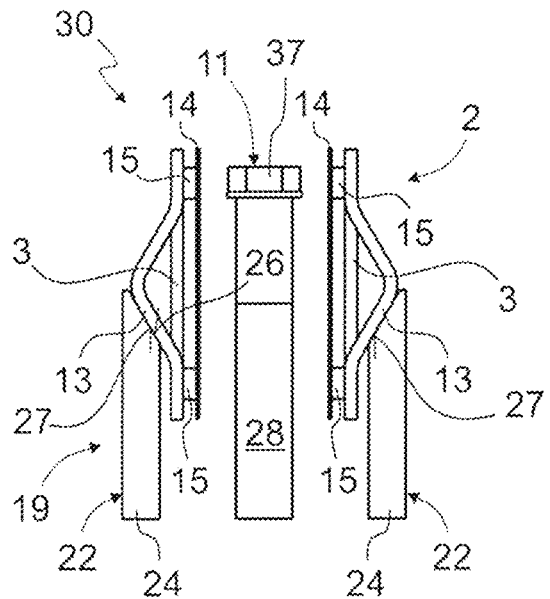
Figure 3B:
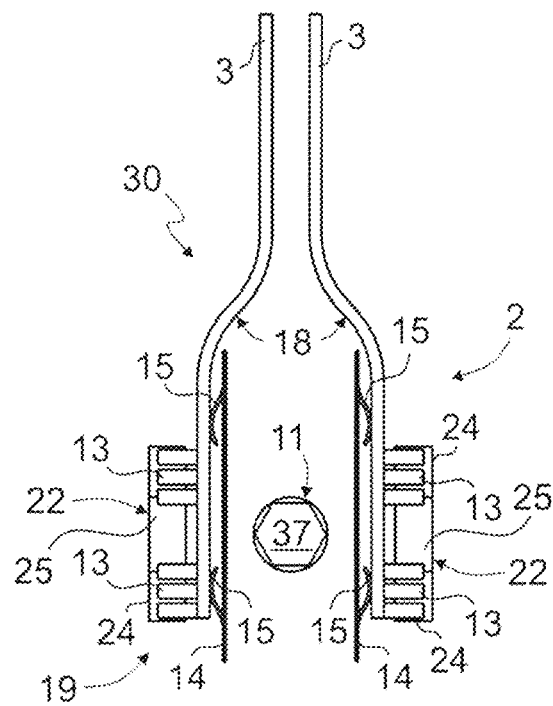
Figure 4A:
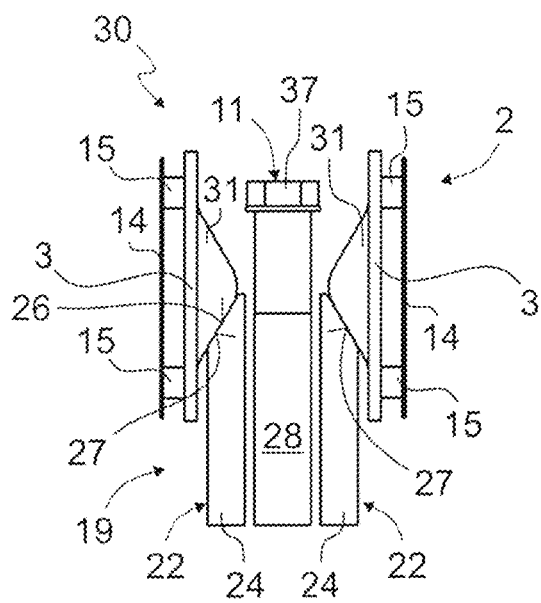
Figure 4B:
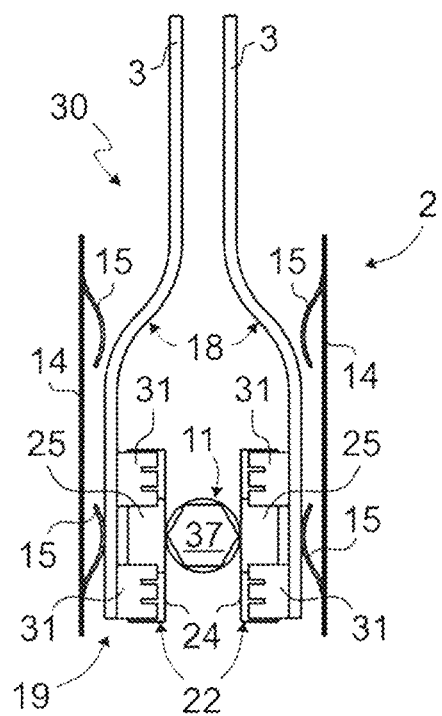
Figure 5A:
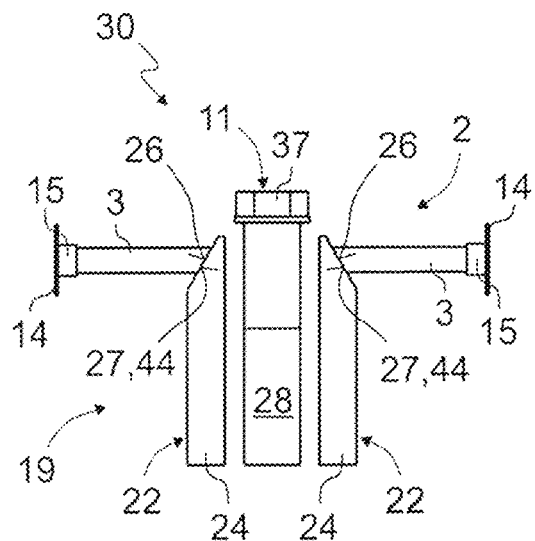
Figure 5B:
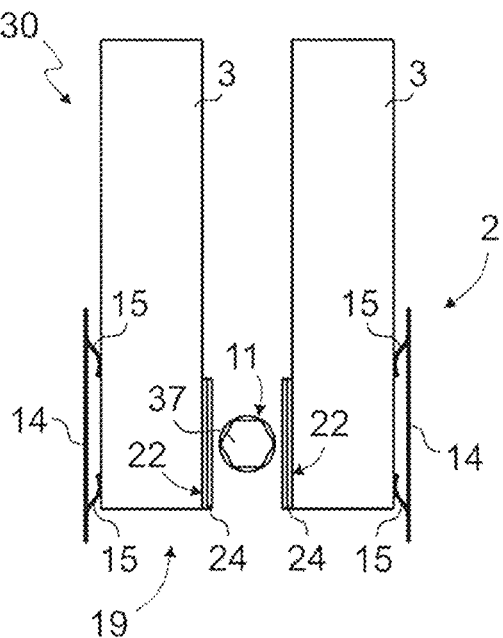

FIGS. 2A, and 2B show an illustration in longitudinal section and a plan view of a first manifestation of contacting, FIGS. 3A, and 38 show an illustration in longitudinal section and a plan view of a second manifestation of contacting, FIGS. 4A, and 4B show an illustration in longitudinal section and a plan view of a third manifestation of contacting, FIGS. 5A, and 5B show an illustration in longitudinal section and a plan view of a fourth manifestation of contacting.

Figure 6A:
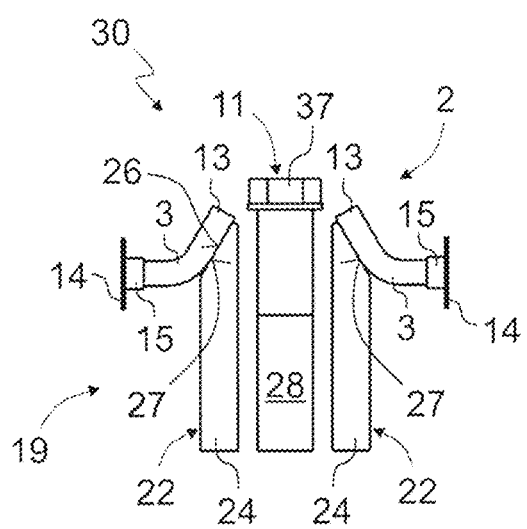

FIGS. 6A, and 68 show an illustration in longitudinal section and a plan view of a fifth manifestation of contacting.

FIGS. 7A, 78, 7C, and 7D show a plan view, an illustration in longitudinal section and a first and a second illustration in cross-section of the plug connector assembly according to the invention in the unplugged state, FIGS. 7E, 7F, 7G, and 7H show a plan view, an illustration in longitudinal section and a first and a second illustration in cross-section of the plug connection according to the invention.

Figure 7A:
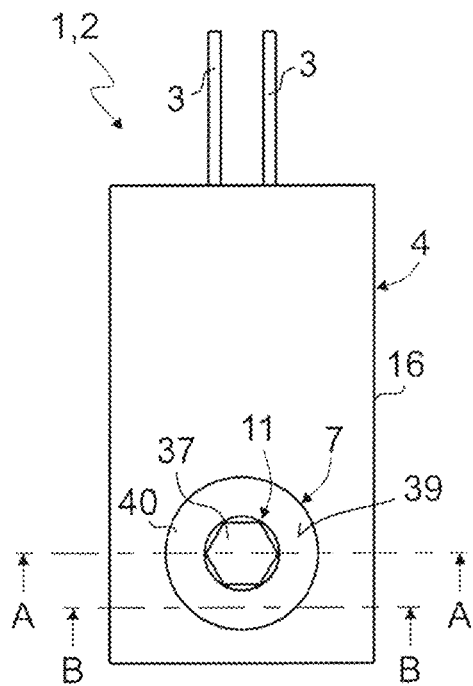
Figure 7B:
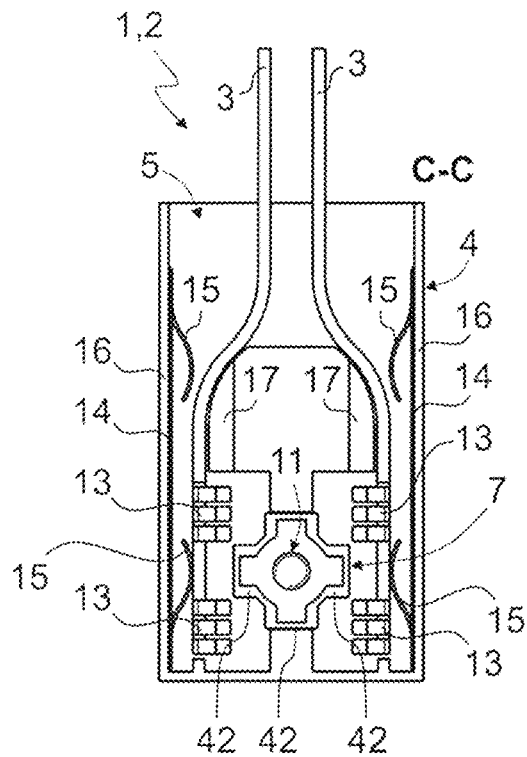
Figure 7C:
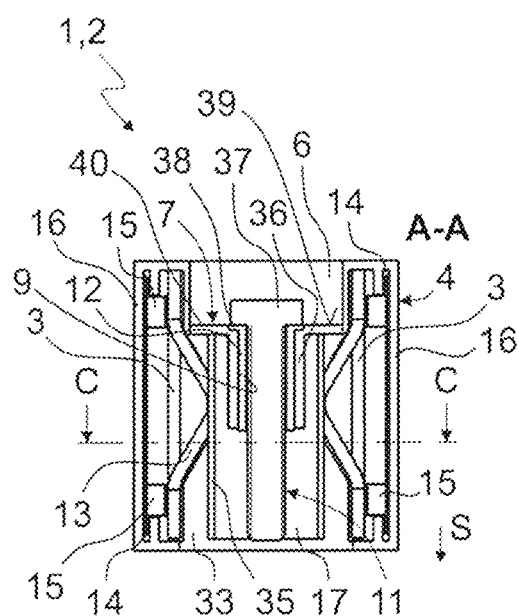
Figure 7D:
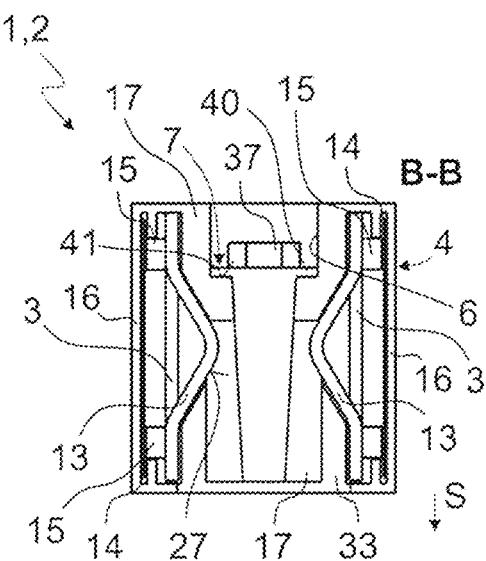
Figure 7E:
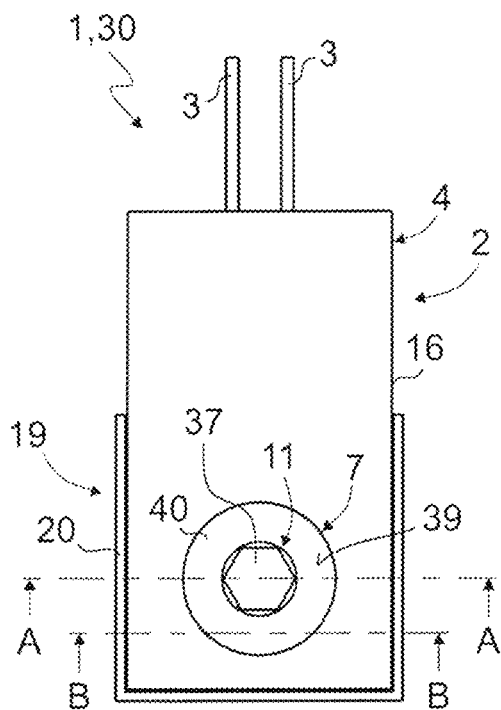
Figure 7F:
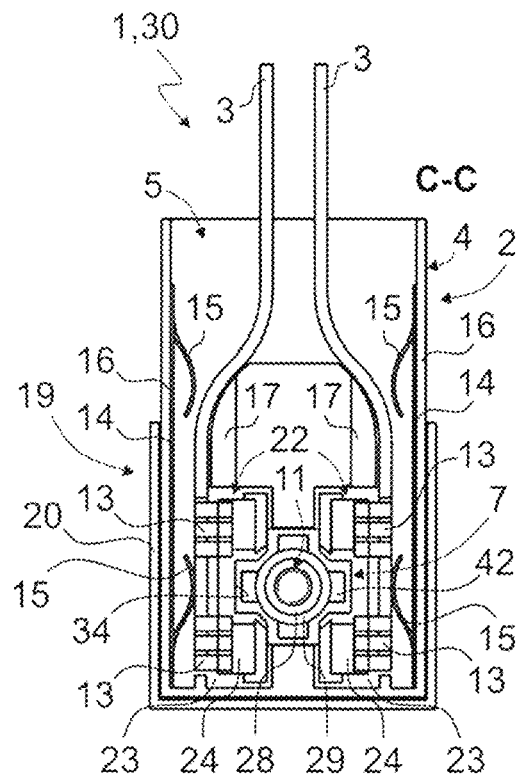
Figure 7G:
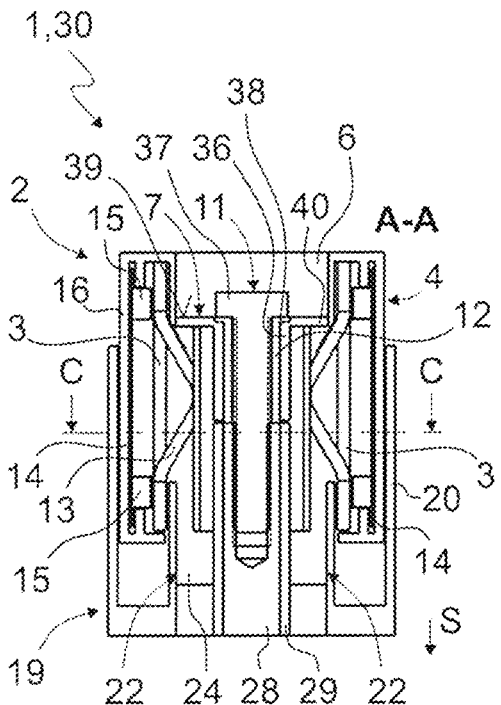
Figure 7H:
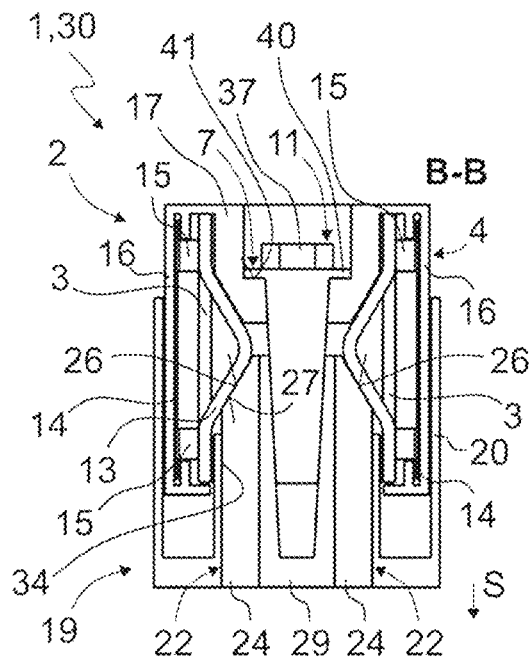
Figure 7I:
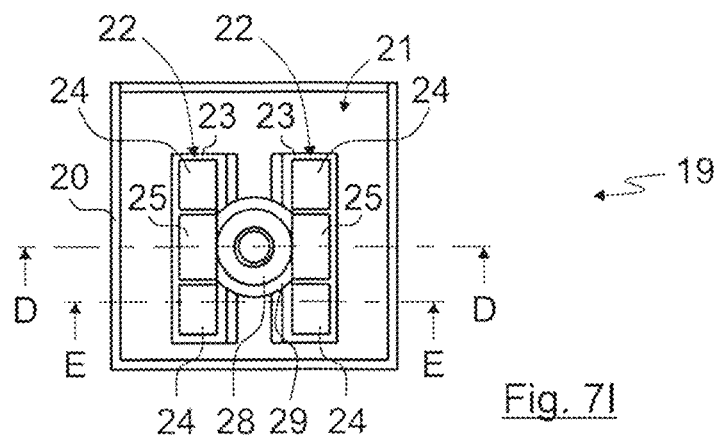
Figure 7J:
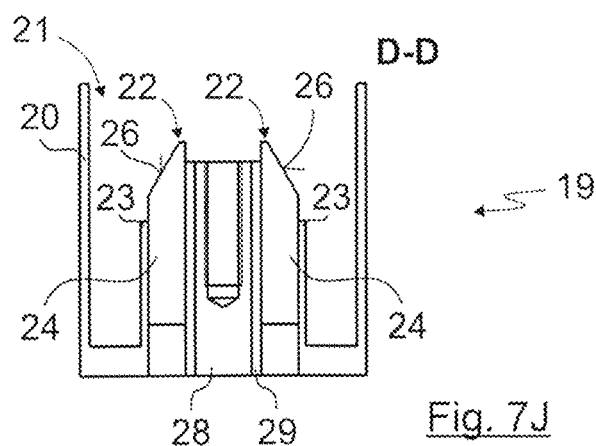
Figure 7K:
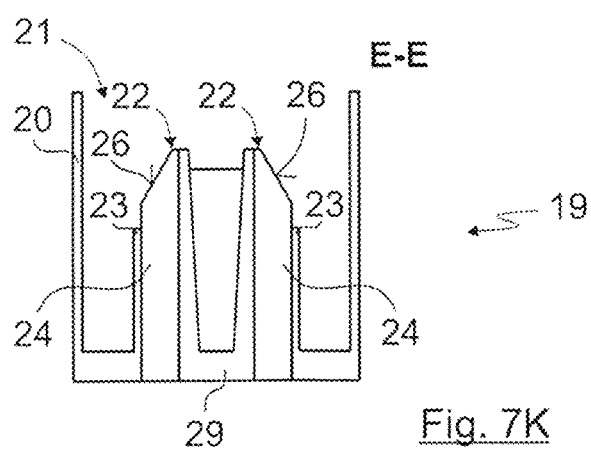

FIGS. 7I, 7J, and 7K show an illustration in cross-section and a first and a second illustration in longitudinal section of the mating plug connector in the unplugged state.

The attached Figures/drawings are intended to enable further understanding of the embodiments of the invention. They illustrate embodiments and serve, in conjunction with the description, to explain principles and concepts of the invention. Other embodiments and many of the advantages mentioned can be found with regard to the drawings. The elements of the drawings are not necessarily shown as true to scale relative to one another.

Identical elements, features and components, those which have the same function and those which act in the same way are, unless explicitly stated otherwise, in each case provided with the same reference numerals.

The Figures will be described below in a connected and comprehensive fashion.

DETAILED WRITTEN DESCRIPTION OF THE PREFERRED EMBODIMENTS

This disclosure of the invention is submitted in furtherance of the constitutional purposes of the US Patent Laws "to promote the progress of science and the useful arts" (Article 1. Section 8).

The structure of the plug connector assembly is explained below on the basis of the exploded illustration in FIG. 1A and the structure of the associated mating plug connector on the basis of the exploded illustration in FIG. 1B:

The plug connector assembly 1 has a plug connector 2 and two electrical conductors 3. Because the two electrical conductors 3 serve not only as connecting elements to an electrical unit or to a further plug connector but also as electrical contacts of the plug connector 2, they can also be understood as constituent parts of the plug connector 2. The plug connector 2 has a plug connector housing 4. The two electrical conductors 3, which are preferably designed as flat electrical conductors, can be inserted into the plug connector housing 4 through a lateral opening 5 of the plug connector housing 4. The opening 5 of the plug connector housing 4 can be closed by a housing cap not illustrated in FIG. 1A and belonging to the plug connector housing 4.

A passage 6, into which a clamping element 7 is inserted, is moreover formed in the plug connector housing 4 transversely to the longitudinal axis of the electrical conductors 3. The clamping element 7 is fixed to the plug connector housing 4 via a latching element 8 with an associated mating latching element which is formed on the inner wall of the passage 6. The clamping element 7 has a passage 9. The helical shaft of a fastening screw 11, which projects from a second end of the passage 9 for screwing to a screw sleeve of the mating plug connector, is inserted through a first end 10 of the passage 9. In order to fasten the metal fastening screw 11 in the passage 9 of the dielectric clamping element 7, a metal sleeve 12 is pressed into the passage 9 of the clamping element 7 at the first end 10. The fastening screw 11 is fastened to the metal sleeve 12 by means of a screw connection between the internal thread of the metal sleeve 12 and the external thread of the fastening screw 11.

Each electrical conductor 3 has a plurality of regions 13 deformed as strips which serve as contact regions of the electrical conductor 3. The electrical conductors 3 illustrated in FIG. 1A have, for example, in each case two regions 13 deformed as strips. In order to increase the number of contact points, the individual regions 13 deformed as strips are, as indicated in FIG. 1A, additionally slotted. The two electrical conductors 3 are inserted through the lateral opening 5 into the plug connector 2, together with an associated metal plate 14 on which a plurality of spring elements in the form of spring tabs 15 are shaped.

The two metal plates 14 with the shaped spring tabs 15 are arranged, in the variant illustrated in FIG. 1A of a plug connector 2, between the outer wall 16 of the plug connector housing 4 and the electrical conductor 3 in order to press the electrical conductor 3 with the associated spring tabs 15 against an inner wall 17 formed in the plug connector housing 4. For this purpose, the inner wall 17 has a shape which is formed so that it complements the shape of the electrical conductor 3 plus the regions 13 deformed as strips. The electrical conductors 3, which are designed as flat electrical conductors, each have a longitudinal section 18, shaped for example into an S, which is pressed by means of the housing cap onto a correspondingly shaped inner wall 17 of the plug connector housing 4. Form-fitting fixing of the electrical conductors 3 on the plug connector housing 4 is thus implemented.

According to FIG. 1B, the mating plug connector 19 has a mating plug connector housing 20 with an opening 21 through which two mating contact elements 22 are inserted into associated retaining regions 23 formed in the mating plug connector housing 20. The mating contact elements 22 each have a number of mating contact regions 24 which corresponds to the number of contact regions, i.e. to the number of deformed regions 13, of the electrical conductors 3. The two mating contact regions 24 form a mating contact element 22, shaped into a U, with the connecting region 25.

A mating contact surface 26 is in each case formed at the axial end of the two mating contact regions 24 which have a pin-shaped longitudinal extent and a rectangularly shaped cross-sectional extent. Each mating contact surface 26 of the mating contact element 22 has in each case a corresponding surface profile with respect to the associated contact surface 27 which is formed in each case in a contact region of the associated electrical conductor 3. The individual contact surface 27 of each electrical conductor 3, as well as the individual mating contact surface 26 of each mating contact element 22, thus has in each case a directional component in or counter to the longitudinal axial direction of the mating contact element 22 and a directional component orthogonal to the longitudinal axial direction of the mating contact element 22.

A metal screw sleeve 28 with an internal thread complementing the external thread of the fastening screw 11 is inserted as a fastening element of the mating plug connector 19 through the opening 21 of the mating plug connector housing 20 into an associated retaining region 29 which is formed in the mating plug connector housing 20.

In the plugged state of the plug connector 2 and the mating plug connector 19, contacting between the contact surfaces 27 of the two electrical conductors 3 and the associated mating contact surfaces 26 of the mating contact elements 22 is possible. For the contacting of the contact surfaces 27, which are formed on the electrical conductors 3 and the contact elements 31 connected to the electrical conductors 3 as a single piece, with the associated mating contact surfaces 26 of the mating contact elements 22, the contact surfaces 27 are accessible for the associated mating contact surfaces 26. For this purpose, the plug connector housing 4 has a further opening in the illustration in FIG. 1A in the rear and lower region.

Before the plug connector assembly 1 according to the invention, the associated plug connector 2 and the associated mating plug connector 19 in the unplugged state and in the plugged state are explained in detail on the basis of various views and sections in FIGS. 7A to 7K, the individual manifestations of the contacting are presented below schematically:

A first manifestation of contacting between two electrical conductors 3 and two associated mating contact elements 22 is apparent in FIGS. 2A and 2B in which the mating contact elements 22 are arranged between the two electrical conductors 3 in the plugged state of the plug connection 30. The two electrical conductors 3 are formed in each case as flat electrical conductors, wherein the larger transverse extent of the flat electrical conductor is oriented parallel to the longitudinal axis of the mating contact elements 22.

The regions 13, deformed as strips, of the electrical conductors 3 are thus directed in the direction of the fastening screw 11. The individual contact surfaces 27 of the electrical conductors thus have a directional component in the longitudinal axial direction of the mating contact elements 22, in particular in the direction of the mating plug connector 19 and a directional component orthogonal to the longitudinal axial direction of the mating contact elements 22, i.e. in the direction of the fastening screw. The spring tabs 15 of the metal plates 14 are arranged outside the electrical conductors 3 and press the contact surfaces 27 of the electrical conductors 3 transversely to the longitudinal axial direction of the mating contact elements 22 against the associated mating contact surfaces 26 of the mating contact elements 22. The fastening screw 11 which is screwed into the corresponding screw sleeve 28 presses the plug connector housing 4 against the mating plug connector housing 20 and thus the contact surfaces 27 of the electrical conductors 3 in the longitudinal axial direction of the mating contact element 22 against the mating contact surfaces 26 of the mating contact elements 22.

In a second manifestation of the contacting according to FIGS. 3A and 38, the electrical conductors 3 are arranged between the associated mating contact elements 22. The metal plates 14 with the associated spring tabs 15 are thus arranged inside the electrical conductors 3 and press the regions 13, deformed outwards as strips, with the contact surfaces 27 formed therein against the mating contact surfaces 26 of the associated mating contact elements 22.

In the case of the third manifestation of the contacting illustrated in FIGS. 4A and 4B, the contact regions of the electrical conductors 3 are directed inwards in the direction of the fastening screw 11. In contrast to the first manifestation of contacting, the contact surfaces are not formed in the electrical conductor 3 and instead are implemented in each case at a contact element which is shaped as a rib, lug, strip or tab and is connected as a single piece, preferably with a material bond, to the associated electrical conductor 3.

In a fourth manifestation of the contacting according to FIGS. 5A and 5B, the electrical conductors 3 designed as flat electrical conductors have, in contrast to the first three manifestations, an orientation of the larger transverse extent of the flat electrical conductors which is oriented in each case orthogonally to the longitudinal axis of the mating contact elements 22.

The contact surface 27 of the individual electrical conductor 3 is formed in each case on a lateral surface 44 of the electrical conductor 3, namely the lateral surface 44 of the electrical conductor 3 with the respective smaller transverse extent, which is arranged transversely to the longitudinal axis of the electrical conductor 3. The lateral surface 44 of the electrical conductor 3 is in each case shaped in such a way that it has a directional component in the longitudinal axial direction of the mating contact element 22 and a directional component orthogonal to the longitudinal axial direction of the mating contact element 22.

Figure 6B:
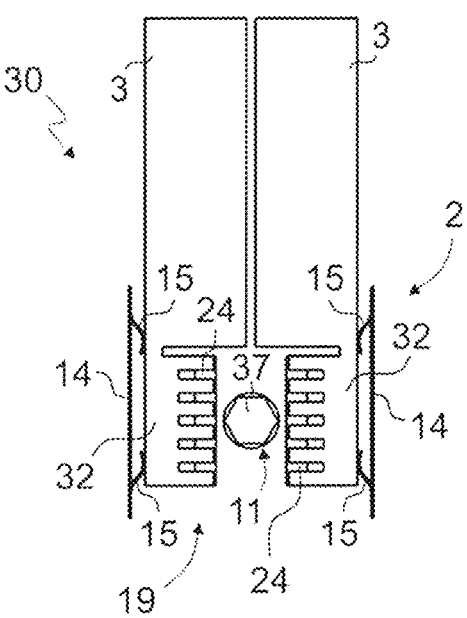

In a fifth manifestation of the contacting according to FIGS. 6A and 6B, the larger transverse extent of the flat electrical conductors is likewise oriented orthogonally to the longitudinal axis of the mating contact elements 22. In the case of the fifth manifestation, an axial end region 32 of the electrical conductors 3 is reshaped in such a way that a deformed region 13 is formed in each case at the axial end region 32 of the electrical conductors 3 with a contact surface 27 which has a directional component in the longitudinal axial direction of the mating contact element 22 and a directional component orthogonal to the longitudinal axial direction of the mating contact element 22.

The deformation of the axial end region 32 of the electrical conductors 3 is effected in each case by a punching and bending process. In order to achieve a higher number of contact points, the deformed region 13 can, as indicated in FIG. 6B, also be shaped so that it is slotted. Also conceivable is a modification to the fifth manifestation of the contacting in which the deformed region 13 is implemented via a correspondingly shaped contact element 31 which is attached to the axial end region 32 of the individual electrical conductor 3 as a single piece, for example by means of a materially bonded connection.

The plug connector assembly 1, the plug connector 2, the mating plug connector 19 and the plug connection 30 are explained in detail in the following FIGS. 7A to 7K on the basis of the first manifestation of the contacting according to FIGS. 2A and 21:

In the unplugged state of a plug connector assembly 1 according to the invention according to FIGS. 7A, 78, 7C and 7D, two electrical conductors 3 formed in each case as flat electrical conductors are inserted into the plug connector housing 4 of the plug connector 2. A longitudinal section 18, shaped into an S, of each electrical conductor 3 bears according to FIG. 78 in form-fitting fashion against a correspondingly bulged inner wall 17 of the plug connector housing 4. In order to fix each electrical conductor 3 in the plug connector housing 4, a housing cap (not illustrated for reasons of clarity), which is fixed on the plug connector housing 4 and presses the two electrical conductors against the inner wall 17 of the plug connector housing 4, is arranged in the lateral opening 5 of the plug connector housing 4.

Two regions 13, deformed as strips, which have in each case a plurality of contact points for contacting an associated mating contact element 22 over a plurality of slots are formed by way of example in each case in the axial end region 32 of each electrical conductor 3. A contact surface 27 with a directional component in the longitudinal axial direction of the mating contact element 22 and a directional component orthogonal to the longitudinal axial direction of the mating contact element 22 is formed in each case at each region 13, deformed as a strip, of the electrical conductor 3.

Each electrical conductor 3 is pressed in the axial end region 32 with the regions 13 deformed as strips via the spring force of a plurality of spring tabs 15 against a correspondingly shaped inner wall 17 of the plug connector housing 4. The individual spring tabs 15 are shaped at a metal plate 14 which is arranged between the outer wall 16 of the plug connector housing 4 and the axial end region 32 of the individual electrical conductor 3.

In order to contact the contact surfaces 27 of the electrical conductors 3 with mating contact surfaces 26 of associated mating contact elements 22, the plug connector housing 4 of the plug connector 4 has in each case receiving chambers for receiving the mating contact elements 22 in the region of the contact surfaces 27 (see FIGS. 7C and 7D).

A clamping element 7 is inserted into a passage 6 which is formed in the plug connector housing 4, in particular in the inner wall 17 of the plug connector housing 4, in the direction of the mating plug connector 19 (see FIGS. 7C and 7D).

The clamping element 7 projects from the passage 6 of the plug connector housing 4 and into a recess 34 which is formed in the mating plug connector housing 20 flush with the passage 6 of the plug connector housing 4. The clamping element 7 is inserted into the recess 34 when the fastening screw 11 is fastened in the screw sleeve 28. For this purpose, the clamping element 7 is connected to the fastening screw 11. The fastening screw 11 is guided centrally in the clamping element 7. For this purpose, the clamping element 7 has a sleeve-shaped region 35 in the inside of which the fastening screw 11 is arranged.

A sleeve-shaped fastening section 36 with a passage 9, which is attached to the sleeve-shaped region 35 of the clamping element 7, is formed in the inside of the sleeve-shaped region 35 of the clamping element 7 for the passage and fastening of the fastening screw 11. For the fastening of the metal fastening screw 11 to the dielectric fastening section 36 of the clamping element 7, a metal sleeve 12 is pressed into the sleeve-shaped fastening section 36 of the clamping element 7 and connected to the fastening screw 11 via a screw connection. The screw head 37 of the fastening screw bears against a flange 38 of the metal sleeve 12. The flange 38 of the metal sleeve 12 bears against an end surface 39 of the clamping element 7 and a flange 40 of the clamping element 7 bears against an end surface 41 of the plug connector housing 4.

In order to effect clamping of the clamping element 7 with the mating plug connector housing 20 inside the recess 34 of the mating plug connector housing 20, four clamping jaws 42 which are directed radially outwards in a cross shape from the sleeve-shaped region 35 of the clamping element 7 are preferably formed at the clamping element 7. The clamping jaws 42, formed in the clamping element 7 in a cross shape, of the clamping element 7 each have a certain elasticity so that they can be pressed into the cross-shaped recess 34 in the mating plug connector housing 20.

The cross-shaped recess 34 is formed between the retaining regions 23 for the mating contact elements 22 and the retaining region 29 for the screw sleeve 28 in the mating plug connector housing 20.

The mating plug connector 19 with the mating plug connector housing 20, in which two mating contact elements 22 are arranged with in each case two mating contact regions 24, is apparent in FIGS. 7I, 7J and 7K. Each mating contact element 22 is shaped as a U by the two mating contact regions 24 being connected to each other via a connecting region 25. Each mating contact element 22 is fastened in an associated retaining region 23 formed in the mating plug connector housing 20. A metal screw sleeve 28 is mounted in a further retaining region 29 which is formed centrally with respect to the other retaining regions 23 in the mating plug connector housing 20.

FIGS. 7E, 7F, 7G and 7H each represent the plug connection 30 in the plugged state of the plug connector 2 and the mating plug connector 19:

The fastening screw 11 is screwed into the screw sleeve 28 such that the plug connector 2 and the mating plug connector 19 are fixed relative to each other. The mating contact elements 22 of the mating plug connector 19 are inserted into the receiving chambers 33 inside the plug connector housing 4. The contact surfaces 27 in the deformed regions 13 of the two electrical conductors 3 contact in each case the mating contact surfaces 26 in the mating contact regions 24 of the mating contact elements 22.

Although the present invention has been described above in full on the basis of preferred exemplary embodiments, it is not limited thereto and instead can be modified in many different ways.

OPERATION

Having described the structure of our plug Connector Assembly and plug Connection, its operation is briefly described.

A principal object of the present invention is a plug connector assembly (1) for connection to a second mating plug connector (19) that has a mating contact surface (26), the plug connector assembly comprising: a plurality of electrical conductors (3), and wherein each of the plurality of electrical conductors (3) has an axial end region (32) and a contact surface (27), and wherein the contact surface (27), has a directional component in a first direction orthogonal to a longitudinal axial direction of the respective one of the plurality of electrical conductors (3), and the respective contact surface (27) additionally has a directional component in a second direction orthogonal to the longitudinal axial direction of the respective one of the plurality of electrical conductors (3) and the second direction is orthogonal to the first orthogonal direction, and wherein the contact surface (27) being capable to electrically contact the mating contact surface (26) of the second mating plug connector (19); and a plug connector (2), the plug connector (2) having a plug connector housing (4) that has an inside, and the axial end regions (32) of the plurality of electrical conductors (3) are fastened to the plug connector housing (4) therein, and at least one spring element (15) is carried inside the plug connector housing (4) for each of the plurality of electrical conductors (3), and the at least one spring element (15) is configured to press the respective one of the plurality of electrical conductors (3), and the associated respective contact surface (27) against the mating contact surface (26) in the first orthogonal direction, and inside the plug connector housing (4) is a fastening element (11) which when connected to a fastening element (28) of the mating plug connector (19) is configured to press the contact surface (27) of each of the plurality of electrical conductors (3) in the second orthogonal direction.

A further object of the present invention is a plug connector assembly (1) wherein the fastening element (11) in the plug connector housing (4) is a fastening screw (11); and the fastening element (28) of the mating plug connector (19) is a screw sleeve (28).

A further object of the present invention is a plug connector assembly (1) wherein the at least one spring element (15) are arranged, in each case, on a side of the plurality of electrical conductors (3) inside the plug connector housing (4) which is situated opposite that side of the plurality of electrical conductors (3) on which the respective contact surface (27) is formed.

A further object of the present invention is a plug connector assembly (1) wherein the at least one spring element (15) which is in the plug connector housing (4) is a spring tab (15) in a metal plate (14).

A further object of the present invention is a plug connector assembly (1) wherein each of the plurality of electrical conductors (3) is configured in such a way that its longitudinal axis is arranged, in a plugged state of the plug connector (2) and the second mating plug connector (19), laterally spaced apart from a longitudinal axis of an associated mating contact element (22) that has the mating contact surface (26).

A further object of the present invention is a plug connector assembly (1) wherein each of the plurality of electrical conductors (3) is deformed laterally with respect to the longitudinal axis of the respective electrical conductor (3) in such a way that the respective contact surface (27) of the respective electrical conductor (3) is formed in a deformed region (13) of the respective electrical conductor (3).

A further object of the present invention is a plug connector assembly (1) wherein the deformed region (13) of the respective electrical conductor (3) is deformed as a strip or as a tab, or as a rib, or as a lug.

A further object of the present invention is a plug connector assembly (1) wherein a lateral surface (44) is shaped on each of the plurality of electrical conductors (3) in such a way that the respective contact surface (27) is formed on the lateral surface (44); and wherein the lateral surface (44) is arranged transversely to the longitudinal axis of the respective one of the plurality of electrical conductors (3).

A further object of the present invention is a plug connector assembly (1) wherein a plurality of contact surfaces (27) are formed on each of the plurality of electrical conductors (3), and wherein each contact surface (27) is configured to electrically contact the associated mating contact surface (26) of the associated second mating plug connector (19).

A further object of the present invention is a plug connector assembly (1) wherein each contact surface (27) has a structured surface.

A further object of the present invention is a plug connector assembly (1), characterized in that in each case a clamping element (7) is inserted into at least one passage (6), which is formed in each case in the plug connector housing (4) in the direction of the mating plug connector (19), and is configured so that it can be inserted into an associated recess (34) which is formed in a mating plug connector housing (20), flush with the respective passage (6) and so that it can be connected to the mating plug connector housing (20) in a force-fitting fashion.

A further object of the present invention is a plug connector assembly (1), characterized in that the respective clamping element (7) is connected to the fastening element the fastening element is configured, when connected to the fastening element of the mating plug connector (19), to press the respective clamping element (7) into the associated recess (34) of the mating plug connector housing (20).

A further object of the present invention is a plug connector assembly (1) wherein each of the plurality of electrical conductors (3) is a flat electrical conductor.

A further object of the present invention is a plug connector assembly (1) wherein each of the plurality of electrical conductors (3) is designed to transmit a current in the range between 300 A and 600 A.

A further object of the present invention is a plug connection (30) comprising: a plug connector assembly (1), the plug connector assembly (1) having, a plurality of electrical conductors (3), and wherein each of the plurality of electrical conductors (3) has an axial end region (32), and a contact surface (27), and wherein the contact surface (27), has a directional component in a first direction orthogonal to a longitudinal axial direction of the respective one of the plurality of electrical conductors (3), and the respective contact surface (27) additionally has a directional component in a second direction orthogonal to the longitudinal axial direction of the respective one of the plurality of electrical conductors (3) and the second direction is orthogonal to the first orthogonal direction, and wherein the contact surface 7) electrically contacts a mating contact surface (26) of a mating plug connector (19); and a plug connector (2) having, a plug connector housing (4) that has an inside, and the axial end regions (32) of the plurality of electrical conductors (3) are fastened to the plug connector housing (4) therein, and at least one spring element (15) is carried inside the plug connector housing (4) for each of the plurality of electrical conductors (3), and the at least one spring element (15) is configured to press the respective one of the plurality of electrical conductors (3), and the associated respective contact surface (27) against the mating contact surface (26) in the first orthogonal direction, and inside the plug connector housing (4) is a fastening element (11) which when connected to a fastening element (28) of the mating plug connector (19) is configured to press the contact surface (27) of each of the plurality of electrical conductors (3) in the second orthogonal direction and against the mating contact surface (26) of the associated mating plug connector (19); and a mating plug connector (19) corresponding to the plug connector (2), the mating plug connector (19), having, a mating contact element (22) that has the mating contact surface (26), and wherein the mating contact surface (26) has a directional component in a direction orthogonal to a longitudinal axial direction of the respective mating contact element (22), and the mating contact surface (26) additionally has a directional component in the longitudinal axial direction of the respective mating contact element (22), and wherein the contact surface (27) on each of the plurality gf electrical conductors (3) electrically contact the mating contact surface (26) formed on the associated mating contact element (22) of the mating plug connector (19).

A further object of the present invention is a plug connector assembly (1) wherein each contact surface (27) has a grooved surface.

A further object of the present invention is a plug connector assembly (1) wherein the electrical conductor (3) has a region forming a single piece contact element (31), and the single piece contact element (31) has the contact surface (27).

A further object of the present invention is a plug connector assembly (1) wherein the deformed region (13) of the respective electrical conductor (3) is deformed as a strip or as a tab, or as a rib, or as a lug.

A further object of the present invention is a plug connector assembly (1), and further comprising: a clamping element (7) that is inserted into at least one passage (6), which is formed in the plug connector housing (4) and extending in the direction of the mating plug connector (19), and the clamping element (7) is configured so that the clamping element (7) can be inserted into an associated recess (34) which is formed in a mating plug connector housing (20), and when the clamping element (7) is inserted into the associated recess (34), the clamping element (7) is flush with the respective passage (6) and so that the clamping element (7) can be connected to the mating plug connector housing (20) in a force-fitting fashion.

A still further object of the present invention is a plug connector assembly (1) wherein the respective clamping element (7) is connected to the fastening element (11), and the fastening element (11) is configured, when connected to the fastening element (28) of the mating plug connector (19), to press the respective clamping element (7) into the associated recess (34) of the mating plug connector housing (20).

An even still further object of the present invention is a plug connector assembly (1) wherein each of the plurality of electrical conductors (3) has a region forming a single piece contact element (31), and the region forming the single piece contact element (31) is the axial end region (32).

In compliance with the statute, the present invention has been described in language more or less specific, as to structural and methodical features. It is to be understood, however, that the invention is not limited to the specific features shown and described since the means herein disclosed comprise preferred forms of gutting the invention into effect. The invention is, therefore, claimed in any of its forms or modifications within the proper scope of the appended claims appropriately interpreted in accordance with the Doctrine of Equivalents.

The invention claimed is:

1. A plug connector assembly (1) for connection to a second mating plug connector (19) that has a mating contact surface (26), the plug connector assembly comprising:
   a plurality of electrical conductors (3), and wherein each of the plurality of electrical conductors (3) has an axial end region (32) and a contact surface (27), and wherein the contact surface (27), has a directional component in a first direction orthogonal to a longitudinal axial direction of the respective one of the plurality of electrical conductors (3), and the respective contact surface (27) additionally has a directional component in a second direction orthogonal to the longitudinal axial direction of the respective one of the plurality of electrical conductors (3) and the second direction is orthogonal to the first orthogonal direction, and wherein
   the contact surface (27) being capable to electrically contact the mating contact surface (26) of the second mating plug connector (19); and
   a plug connector (2), the plug connector (2) having
      a plug connector housing (4) that has an inside, and the axial end regions (32) of the plurality of electrical conductors (3) are fastened to the plug connector housing (4) therein, and
      at least one spring element (15) is carried inside the plug connector housing (4) for each of the plurality of electrical conductors (3), and the at least one spring element (15) is configured to press the respective one of the plurality of electrical conductors (3), and the associated respective contact surface (27) against the mating contact surface (26) in the first orthogonal direction, and
      inside the plug connector housing (4) is a fastening element (11) which when connected to a fastening element (28) of the mating plug connector (19) is configured to press the contact surface (27) of each of the plurality of electrical conductors (3) in the second orthogonal direction.

2. The plug connector assembly (1) as claimed in claim 1, and wherein the fastening element (11) in the plug connector housing (4) is designed as a fastening screw (11); and
   the fastening element (28) of the mating plug connector (19) is a screw sleeve (28).

3. The plug connector assembly (1) as claimed in claim 1, and wherein the at least one spring element (15) are arranged, in each case, on a side of the plurality of electrical conductors (3) inside the plug connector housing (4) which is situated opposite that side of the plurality of electrical conductors (3) on which the respective contact surface (27) is formed.

4. The plug connector assembly (1) as claimed in claim 1, and wherein the at least one spring element (15) which is in the plug connector housing (4) is a spring tab (15) in a metal plate (14).

5. The plug connector assembly (1) as claimed in claim 1 and wherein each of the plurality of electrical conductors (3) is configured in such a way that its longitudinal axis is arranged, in a plugged state of the plug connector (2) and the second mating plug connector (19), laterally spaced apart from a longitudinal axis of an associated mating contact element (22) that has the mating contact surface (26).

6. The plug connector assembly (1) as claimed in claim 5, and wherein each of the plurality of electrical conductors (3) is deformed laterally with respect to the longitudinal axis of the respective electrical conductor (3) in such a way that the respective contact surface (27) of the respective electrical conductor (3) is formed in a deformed region (13) of the respective electrical conductor (3).

7. The plug connector assembly (1) as claimed in claim 6, and wherein the deformed region (13) of the respective electrical conductor (3) is deformed as a strip or as a tab, or as a rib, or as a lug.

8. The plug connector assembly (1) as claimed in claim 5, and wherein a lateral surface (44) is shaped on each of the plurality of electrical conductors (3) in such a way that the respective contact surface (27) is formed on the lateral surface (44); and wherein
   the lateral surface (44) is arranged transversely to the longitudinal axis of the respective one of the plurality of electrical conductors (3).

9. The plug connector assembly (1) as claimed in claim 1 and wherein a plurality of contact surfaces (27) are formed on each of the plurality of electrical conductors (3), and wherein
   each contact surface (27) is configured to electrically contact the associated mating contact surface (26) of the associated second mating plug connector (19).

10. The plug connector assembly (1) as claimed in claim 1, and wherein each contact surface (27) has a structured surface.

11. The plug connector assembly (1) as claimed in claim 1, and wherein each of the plurality of electrical conductors (3) is a flat electrical conductor.

12. The plug connector assembly (1) as claimed in claim 1, and wherein each of the plurality of electrical conductors (3) is designed to transmit a current in the range between 300 A and 600 A.

13. The plug connector assembly (1) as claimed in claim 1, and wherein each contact surface (27) has a grooved surface.

14. The plug connector assembly (1) as claimed in claim 1, and wherein the electrical conductor (3) has a region forming a single piece contact element (31), and the single piece contact element (31) has the contact surface (27).

15. The plug connector assembly (1) as claimed in claim 14, and wherein the deformed region (13) of the respective electrical conductor (3) is deformed as a strip or as a tab, or as a rib, or as a lug.

16. The plug connector assembly (1) as claimed in claim 1, and wherein each of the plurality of electrical conductors (3) has a region forming a single piece contact element (31), and the region forming the single piece contact element (31) is the axial end region (32).

17. A plug connection (30) comprising:
a plug connector assembly (1), the plug connector assembly (1) having,
a plurality of electrical conductors (3), and wherein each of the plurality of electrical conductors (3) has an axial end region (32), and a contact surface (27), and wherein
the contact surface (27), has a directional component in a first direction orthogonal to a longitudinal axial direction of the respective one of the plurality of electrical conductors (3), and the respective contact surface (27) additionally has a directional component in a second direction orthogonal to the longitudinal axial direction of the respective one of the plurality of electrical conductors (3) and the second direction is orthogonal to the first orthogonal direction, and wherein
the contact surface (27) electrically contacts a mating contact surface (26) of a mating plug connector (19); and
a plug connector (2) having,
a plug connector housing (4) that has an inside, and the axial end regions (32) of the plurality of electrical conductors (3) are fastened to the plug connector housing (4) therein, and
at least one spring element (15) is carried inside the plug connector housing (4) for each of the plurality of electrical conductors (3), and the at least one spring element (15) is configured to press the respective one of the plurality of electrical conductors (3), and the associated respective contact surface (27) against the mating contact surface (26) in the first orthogonal direction, and
inside the plug connector housing (4) is a fastening element (11) which when connected to a fastening element (28) of the mating plug connector (19) is configured to press the contact surface (27) of each of the plurality of electrical conductors (3) in the second orthogonal direction and against the mating contact surface (26) of the associated mating plug connector (19); and
a mating plug connector (19) corresponding to the plug connector (2), the mating plug connector (19), having,
a mating contact element (22) that has the mating contact surface (26), and wherein the mating contact surface (26) has a directional component in a direction orthogonal to a longitudinal axial direction of the respective mating contact element (22), and
the mating contact surface (26) additionally has a directional component in the longitudinal axial direction of the respective mating contact element (22), and wherein
the contact surface (27) on each of the plurality of electrical conductors (3) electrically contact the mating contact surface (26) formed on the associated mating contact element (22) of the mating plug connector (19).

18. The plug connector assembly (1) as claimed in claim 17 and further comprising:
a clamping element (7) that is inserted into at least one passage (6), which is formed in the plug connector housing (4) and extending in the direction of the mating plug connector (19), and
the clamping element (7) is configured so that the clamping element (7) can be inserted into an associated recess (34) which is formed in a mating plug connector housing (20), and
when the clamping element (7) is inserted into the associated recess (34), the clamping element (7) is flush with the respective passage (6) and so that the clamping element (7) can be connected to the mating plug connector housing (20) in a force-fitting fashion.

19. The plug connector assembly (1) as claimed in claim 17, and wherein the respective clamping element (7) is connected to the fastening element (11), and
the fastening element (11) is configured, when connected to the fastening element (28) of the mating plug connector (19), to press the respective clamping element (7) into the associated recess (34) of the mating plug connector housing (20).

* * * * *